(12) United States Patent
Canfield et al.

(10) Patent No.: US 11,794,142 B2
(45) Date of Patent: Oct. 24, 2023

(54) PULSE CLEANABLE DEEP PLEATED INDUSTRIAL FILTER

(71) Applicants: Jeff A. Canfield, Belton, MO (US); Jeffery M. Ladwig, Overland Park, KS (US); Dale R. Kadavy, Overland Park, KS (US)

(72) Inventors: Jeff A. Canfield, Belton, MO (US); Jeffery M. Ladwig, Overland Park, KS (US); Dale R. Kadavy, Overland Park, KS (US)

(73) Assignee: Parker-Hannifin Corporation, Cleveland, OH (US)

( * ) Notice: Subject to any disclaimer, the term of this patent is extended or adjusted under 35 U.S.C. 154(b) by 287 days.

(21) Appl. No.: 17/087,980

(22) Filed: Nov. 3, 2020

(65) Prior Publication Data

US 2021/0129068 A1    May 6, 2021

Related U.S. Application Data

(60) Provisional application No. 63/001,999, filed on Mar. 30, 2020, provisional application No. 62/930,592, filed on Nov. 5, 2019.

(51) Int. Cl.
| | | |
|---|---|---|
| *B01D 46/52* | (2006.01) | |
| *B01D 46/54* | (2006.01) | |
| *B01D 46/00* | (2022.01) | |
| *B01D 46/71* | (2022.01) | |

(52) U.S. Cl.
CPC ....... *B01D 46/523* (2013.01); *B01D 46/0001* (2013.01); *B01D 46/0002* (2013.01); *B01D 46/522* (2013.01); *B01D 46/546* (2013.01); *B01D 46/71* (2022.01); *B01D 2265/04* (2013.01); *B01D 2271/027* (2013.01)

(58) Field of Classification Search
CPC .......... B01D 2265/04; B01D 2271/027; B01D 46/523; B01D 46/71; B01D 46/0001; B01D 46/0002; B01D 46/522; B01D 46/546
USPC .......................................... 55/491, 521, 302
See application file for complete search history.

(56) References Cited

U.S. PATENT DOCUMENTS

| | | |
|---|---|---|
| 5,071,555 A | 12/1991 | Enbom |
| 5,290,447 A | 3/1994 | Lippold |
| 5,804,014 A | 9/1998 | Kähler |
| 5,820,646 A | 10/1998 | Gillingham et al. |
| 6,190,432 B1 | 2/2001 | Gieseke et al. |
| 6,235,195 B1 | 5/2001 | Tokar |
| 6,491,743 B1 | 12/2002 | Joannou et al. |
| 6,685,833 B2 | 2/2004 | Lippold |
| 7,364,607 B2 | 4/2008 | Ueda et al. |
| 7,488,365 B2 | 2/2009 | Golden et al. |

(Continued)

FOREIGN PATENT DOCUMENTS

| | | |
|---|---|---|
| DE | 19755466 A1 | 6/1999 |
| WO | WO 2013/134048 A1 | 9/2013 |

*Primary Examiner* — Robert A Hopkins
*Assistant Examiner* — Qianping He
(74) *Attorney, Agent, or Firm* — Reinhart Boerner Van Deuren P.C.

(57) ABSTRACT

A filter media pack with pleat folds, pleat panels and a plurality of glue bead sections is provided. The glue bead sections provide increased rigidity, dimensional stability and maintain spacing between adjacent pleat panels. Methods of manufacturing the filter media packs are provided. Filter elements including the filter media packs are contemplated.

29 Claims, 10 Drawing Sheets

(56) References Cited

U.S. PATENT DOCUMENTS

| | | |
|---|---|---|
| 7,722,699 B2 | 5/2010 | Morgan et al. |
| 7,905,936 B2 | 3/2011 | Coulonvaux et al. |
| 9,283,503 B2 | 3/2016 | Raether et al. |
| 9,510,557 B2 | 12/2016 | Ball et al. |
| 11,117,079 B2 | 9/2021 | Stanhope et al. |
| 2009/0044702 A1* | 2/2009 | Adamek ............... B01D 46/546 55/486 |
| 2010/0326028 A1* | 12/2010 | Sundet ............... B01D 39/1623 55/499 |
| 2014/0165839 A1* | 6/2014 | Crabtree ............. B01D 46/522 55/497 |
| 2016/0067647 A1* | 3/2016 | Tate ................... B01D 46/523 156/219 |
| 2016/0236132 A1* | 8/2016 | Hara ................... B01D 46/0001 |
| 2018/0056226 A1* | 3/2018 | Buettner, III .......... B01D 39/00 |
| 2018/0207566 A1* | 7/2018 | Stanhope .............. B01D 35/306 |
| 2019/0046909 A1 | 2/2019 | Haas et al. |
| 2019/0299035 A1* | 10/2019 | Sebastian ........... B01D 39/1623 |

\* cited by examiner

PULSE CLEANABLE DEEP PLEATED INDUSTRIAL FILTER

CROSS-REFERENCE TO RELATED PATENT APPLICATIONS

This patent application claims the benefit of U.S. Provisional Patent Application No. 63/001,999, filed Mar. 30, 2020, and claims the benefit of U.S. Provisional Patent Application No. 62/930,592, filed Nov. 5, 2019, the entire teachings and disclosure of which are incorporated herein by reference thereto.

FIELD OF THE INVENTION

The present invention relates to a filter elements and particularly pleated filter elements that can be reverse pulse cleaned.

BACKGROUND OF THE INVENTION

Filter elements are often reverse pulse cleaned to extend the service life of the filter element once they become sufficiently loaded with particulates. This is particularly true with air filters.

Pleated filter media packs are often used in filter elements. However, the depth of the pleated media pack (e.g. the height of the pleat panels), has typically been limited due to undesirable collapse of the pleat panels which can blind off portions of the filter media, block flow paths between adjacent pleat panels as well as inhibit the effectiveness of reverse pulse cleaning.

Deep pleat filter media packs often suffer from insufficient rigidity in the pleated filter media, which can allow the filter media pack to distort in shape under excessive pressure differentials. This can further inhibit the ability to clean a filter media pack using the reverse pulse procedures.

The lack of rigidity can also affect the ability to form pleated filter media packs of varying shapes.

Some prior art includes U.S. Pat. Nos. 6,190,432; 6,235,195; 7,488,365; 7,905,936; and 9,283,503.

BRIEF SUMMARY OF THE INVENTION

The present invention provides new and improved filter media packs and particularly new and improved pleated filter media packs as well as filter elements including the filter media packs.

In an embodiment, a filter media pack for a filter element is provided. In a more particularly implementation, a filter element using the filter media pack is provided. The filter media pack includes a pleated media pack formed from a continuous sheet of filter media having opposed surfaces with a thickness therebetween. The pleated filter media has a plurality of pleat panels. Each pleat panel of the plurality of pleat panels has a height. A plurality of pleat folds are provided. Each pleat fold of the plurality of pleat folds interconnects a corresponding pair of adjacent pleat panels of the plurality of pleat panels. Each pleat fold has a fold inner side (e.g. the valley side) and a fold outer side (e.g. the peak side). The height of each pleat panel is defined between the pleat folds associated with each pleat panel (e.g. the pleat folds connected at each end of the pleat panel).

At each pleat fold, there is an outer glue bead section, a first inner glue bead section and a second inner glue bead section. The outer glue bead section on the fold outer side extends across the pleat fold with the pleat fold interposed between opposed first and second ends of the outer glue bead section. The outer glue bead section has a first portion between the first end and the pleat fold and a second portion between the second end and the pleat fold. The first inner glue bead section extends between first and second ends on the fold inner side overlapped with the first portion of the outer glue bead section. The first inner glue bead section is spaced away from the pleat fold and does not extend across the pleat fold. The second inner glue bead section extends between first and second ends on the fold inner side overlapped with the second portion of the first outer glue bead section. The second glue bead section is spaced away from the pleat fold and does not extend across the pleat fold.

When folded, the first and second inner glue bead sections at each pleat fold contact one another to secure the adjacent pleat panels interconnected by the pleat fold relative to one another.

In one embodiment, a first distance is defined between the second end of the first inner glue bead section and the pleat fold. A second distance is defined between the first end of the second inner glue bead section and the pleat fold. The second distance is different than the first distance.

In one embodiment, the thicknesses of the first and second inner glue bead sections at each pleat fold measured perpendicular to the surfaces of the sheet of filter media are substantially the same (e.g. plus or minus 15% and more preferably no more than plus or minus 5%).

In one embodiment, the outer glue bead section at one pleat fold is on an opposite surface of the sheet of filter media as the outer glue bead section at another immediately adjacent pleat fold. As such, portions of separate outer glue bead section on a same pleat panel are on opposite sides of the pleat panel.

In one embodiment, for each pleat panel of the plurality of pleat panels, the pleat panel has attached thereto: the first portion of an outer glue bead section at a first pleat fold connected to the pleat panel; the first inner glue bead section at the first pleat fold connected to the pleat panel; the second portion of an outer glue bead section at a second pleat fold connected to the pleat panel; and the second inner glue bead section at the second pleat fold connected to the pleat panel.

In one embodiment, for each pleat panel of the plurality of pleat panels, the first portion of the outer glue bead section at the first pleat fold connected to the pleat panel and the second inner glue bead section at the second pleat fold connected to the pleat panel are located on a same first surface of the pleat panel; and the second portion of the outer glue bead section at the second pleat fold connected to the pleat panel and the first inner glue bead section at the first pleat fold connected to the pleat panel are located on a same second surface of the pleat panel, the second surface being opposite the first surface.

In one embodiment, a first gap is formed between the first portion of the outer glue bead section at the first pleat fold connected to the pleat panel and the second inner glue bead section at the second pleat fold connected to the pleat panel. A second gap is formed between the second portion of the outer glue bead section at the second pleat fold connected to the pleat panel and the first inner glue bead section at the first pleat fold connected to the pleat panel.

In one embodiment, a mid-point of the height of each pleat panel located between the first and second pleat folds connected to the pleat panel is positioned within the first and second gaps.

In one embodiment, the first and second gaps are centered on the mid-point of the height.

In one embodiment, lengths of the first portion of the outer glue bead section at the first fold connected to the pleat panel and the second glue bead portion of the outer glue bead section at the second fold connected to the pleat panel are greater than lengths of the first and second gaps.

In one embodiment, when the sheet of filter media is folded, the first portion of an outer glue bead at a first fold contacts the second portion of an outer glue bead at a second fold, the first and second folds not being connected to a same pleat panel.

In one embodiment, the first inner glue bead section has a first length and the second inner glue bead section has a second length. At each pleat fold, when folded the first end of the first inner glue bead section aligns with the second end of the second inner glue bead section; and the second end of the first inner glue bead section is offset from the first end of the second inner glue bead section. The second end of the first inner glue bead section being closer to the pleat fold than the first end of the second inner glue bead section.

In one embodiment, at each pleat fold, each pleat panel interconnected by the pleat fold has a tapered portion extending outward from the pleat fold less than or equal to the second distance with the tapered portions tapering extend away from one another when moving away from the pleat fold.

In one embodiment, the first distance is less than 10% of the height of the pleat panels.

In one embodiment, each pleat panel has two tapered portions. One tapered portion is associated with each pleat fold connected to the pleat panel. Each pleat panel also includes a parallel portion formed between the tapered portions. The parallel portions of adjacent pleat panels being parallel with one another when the filter media sheet is folded about the pleat folds.

In one embodiment, each parallel portion has a length that is at least 80% of the height of the pleat panel.

In one embodiment, a thickness of any glue forming any glue bead or beads between adjacent tapered portions proximate each pleat fold is less than twice the thickness of any one of the outer glue bead section, the first inner glue bead section or the second inner glue bead section.

In one embodiment, no glue bead extends across the pleat fold on the inner side of the pleat folds (e.g. in the valley).

In one embodiment, the plurality of pleat folds alternate between being folded in a first fold direction and a second fold direction that is opposite the first fold direction.

In one embodiment, for each pleat fold, the fold inner side is positioned between the corresponding pair of adjacent pleat panels that are interconnected by the pleat fold formed by one of the opposed surfaces of the filter media and the fold outer side is formed by the other one of the opposed surfaces of the filter media.

In one embodiment, there are at each pleat fold 1) a plurality of outer glue bead sections that are laterally spaced apart along the pleat fold; 2) a plurality of first inner glue bead sections that are laterally spaced apart along the pleat fold; and 3) a plurality of second inner glue bead sections that are laterally spaced apart along the pleat fold.

In one embodiment, the lateral spacing between adjacent ones of the outer glue bead sections of the plurality of outer glue bead sections is no greater than 2"; the lateral spacing between adjacent ones of the first inner glue bead sections of the plurality of first inner glue bead sections is no greater than 2"; and the lateral spacing between adjacent ones of the second inner glue bead sections of the plurality of second inner glue bead sections is no greater than 2".

In one embodiment, an external cover surrounds the pleated media pack. A reinforcing grid extends across at least one flow face defined by a plurality of the pleat folds. The reinforcing grid includes a radially extending support flange. A seal member is carried by the radially extending support flange.

In one embodiment, the pleat folds extend widthwise across the media pack.

In an embodiment, a method of forming a filter element is provided. The method is for forming a filter element as outlined above. In particular the method includes forming a pleated media pack from continuous sheet of filter media having opposed surfaces with a thickness therebetween. Forming the pleated filter media pack includes folding the continuous sheet of filter media to form a plurality of pleat panels interconnected by a plurality of pleat folds. Each pleat panel of the plurality of pleat panels has a height. The height of each pleat panel is defined between the pleat folds associated with each pleat panel. Each pleat fold of the plurality of pleat folds interconnects a corresponding pair of adjacent pleat panels of the plurality of pleat panels. Each pleat fold has a fold inner side and a fold outer side.

The method further includes applying an outer glue bead section on the fold outer side extending across the pleat fold with the pleat fold interposed between opposed first and second ends of the outer glue bead section. The outer glue bead section has a first portion between the first end and the pleat fold and a second portion between the second end and the pleat fold. The method includes applying a first inner glue bead section extending between first and second ends on the fold inner side overlapped with the first portion of the outer glue bead section. The first inner glue bead section is spaced away from the pleat fold and not extending across the pleat fold. The method includes applying a second inner glue bead section extending between first and second ends on the fold inner side overlapped with the second portion of the outer glue bead section. The second inner glue bead section is spaced away from the pleat fold and not extending across the pleat fold.

The step of folding occurs after the steps of applying the outer glue bead section, applying the first inner glue bead section, and applying the second inner glue bead section. The step of folding contacts the first inner glue bead section with the second inner glue bead section at each pleat fold to secure the adjacent pleat panels interconnected by the pleat fold relative to one another.

In one method, the step of folding contacts a portion of an outer glue bead at a first fold with a second portion of an outer glue bead at a second fold. The first and second folds are not being connected to a same pleat panel.

In an embodiment, a filter element is provided. The filter element includes a pleated media pack having pleats opening axially on opposed faces of the pack and arranged with pleat peaks extending widthwise across the media. The pleated media pack includes glue beads applied in discrete, non-continuous, parallel lines along the length of the media on both surfaces of the media. When the media is pleated, the glue beads are in adjoining relation to one another along opposed media surfaces to retain the pleat peaks in a fixed arrangement relative to each other. The filter element includes a cover outwardly surrounding the pack.

In one embodiment, glue beads extend across the pleat peaks of the media pack but do not extend across the pleat valleys.

In one embodiment, at least one reinforcing grid is secured across one of the pack faces and along a portion of the one pack face.

In one embodiment, a support flange extends along the one face of the pack and around the periphery of the pack.

In one embodiment, a filter element comprising a pleated media pack is provided. The pleated media pack is formed from a continuous sheet of filter media having opposed surfaces with a thickness therebetween. The pleated filter media pack has a plurality of pleat panels. Each pleat panel of the plurality of pleat panels has a height. The filter media pack has a plurality of pleat folds. Each pleat fold of the plurality of pleat folds interconnects a corresponding pair of adjacent pleat panels of the plurality of pleat panels. Each pleat fold has a fold inner side and a fold outer side. The height of each pleat panel is defined between the pleat folds associated with each pleat panel. Each pleat fold has an outer glue bead section on the fold outer side. The outer glue bead section extends across the pleat fold with the pleat fold interposed between opposed first and second ends of the outer glue bead section. The outer glue bead section has a first portion between the first end and the pleat fold. The first portion is on a first one of the pair of pleat panels interconnected by the pleat fold. The outer glue bead section has a second portion between the second end and the pleat fold. The second portion is on a second one of the pair of pleat panels interconnected by the pleat fold. The first portion extends at least 80% of the height of the first one of the pair of pleat panels. The second portion extends at least 80% of the height of the second one of the pair of pleat panels. This arrangement is such that each pleat fold has the outer glue bead section extending across the pleat fold on the fold outer side. On the inner side, each please fold has a first portion of an outer glue bead section of a first adjacent pleat fold connected to the first one of the pair of pleat panels; and a second portion of an outer glue bead section of a second adjacent pleat fold connected to the second one of the pair of pleat panels.

In one embodiment, an end of the first portion of the outer glue bead section of the first adjacent pleat fold is offset from an end of the second portion of the outer glue bead section of the second adjacent pleat fold when the pleat fold is in a folded state.

In one embodiment, the first portion of the outer glue bead section of the first adjacent pleat fold and the second portion of the outer glue bead section of the second adjacent pleat fold contact one another to secure the first and second adjacent pleat panels relative to one another when the pleat fold is in a folded state.

In one embodiment, at each pleat fold, each pleat panel interconnected by the pleat fold has a tapered portion extending outward from the pleat fold less than or equal to 20% of the height. The tapered portions taper away from one another when moving away from the pleat fold.

In one embodiment, the tapered portions extend outward from the pleat fold less than 10% of the height of the pleat panels.

In one embodiment, each pleat panel has two tapered portions, one tapered portion associated with each pleat fold connected to the pleat panel and a parallel portion formed between the tapered portions. The parallel portions of adjacent pleat panels being parallel with one another, when the filter media sheet is folded about the pleat folds.

In one embodiment, each parallel portion has a length that is at least 80% of the height of the pleat panel.

In one embodiment, a filter arrangement is provided. The filter arrangement includes a filter element as outlined above. The filter element includes a support grid mounted to an outlet face of the filter media pack. The support grid includes a plurality of grid bars that extend outward from the outlet face at a non-perpendicular, non-parallel angle relative to the outlet face.

In one embodiment, the filter arrangement is configured to provide a reverse pulse air flow to the outlet face of the filter media pack to blow air through the filter media in a direction opposite a direction air flows during filtering. The reverse pulse air flow is directed at the outlet face at a non-parallel, non-perpendicular angle relative to the outlet face.

In one embodiment, the grid bars extend away from the flow path of the reverse pulse air flow as the grid bars extend outward and away from the outlet face. This arrangement helps redistribute the reverse pulse air flow to a greater portion of the filter media pack.

In an embodiment, a method of forming a preceding filter element is provided. The method includes forming a pleated media pack from continuous sheet of filter media having opposed surfaces with a thickness therebetween. Forming the pleated filter media pack includes folding the continuous sheet of filter media to form a plurality of pleat panels interconnected by a plurality of pleat folds. Each pleat panel of the plurality of pleat panels has a height. The height of each pleat panel is defined between the pleat folds associated with/connected to each pleat panel. Each pleat fold of the plurality of pleat folds interconnects a corresponding pair of first and second adjacent pleat panels of the plurality of pleat panels. Each pleat fold has a fold inner side and a fold outer side. The method includes applying, at each pleat fold, an outer glue bead section on the fold outer side. The outer glue bead section extends across the pleat fold with the pleat fold interposed between opposed first and second ends of the outer glue bead section. The outer glue bead section has a first portion between the first end and the pleat fold. The first portion is on the first pleat panel of the pair of pleat panels interconnected by the pleat fold. The outer glue bead section has a second portion between the second end and the pleat fold. The second portion is on the second pleat panel of the pair of pleat panels interconnected by the pleat fold. The first portion extends at least 80% of the height of the first pleat panel of the pair of pleat panels. The second portion extends at least 80% of the height of the second pleat panel of the pair of pleat panels.

Applying the outer glue bead section on the outer side of each pleat fold results in: 1) an outer glue bead section extending across the pleat fold on the fold outer side; 2) a first portion of an outer glue bead section of a first adjacent pleat fold connected to the first pleat panel of the pair of pleat panels positioned within the pleat fold on the fold inner side; and 3) a second portion of an outer glue bead section of a second adjacent pleat fold connected to the second pleat panel of the pair of pleat panels positioned within the pleat fold on the fold inner side.

In one method, folding the continuous sheet contacts the first portion of the outer glue bead section of the first adjacent pleat fold with the second portion of the outer glue bead section of the second adjacent pleat fold to secure the first and second adjacent pleat panels relative to one another.

The filter media used in the filter elements and methods outlined above can include a gradient density nanofiber layer. More particularly the gradient density nanofiber layer can include a layer of coarse nanofibers applied upstream of a layer of finer nanofibers. This gradient density nanofiber layer may or may not be applied to a base layer of filter media. The layer of coarse nanofibers having an average fiber diameter that is greater than the average fiber diameter of the layer of finer nanofibers.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
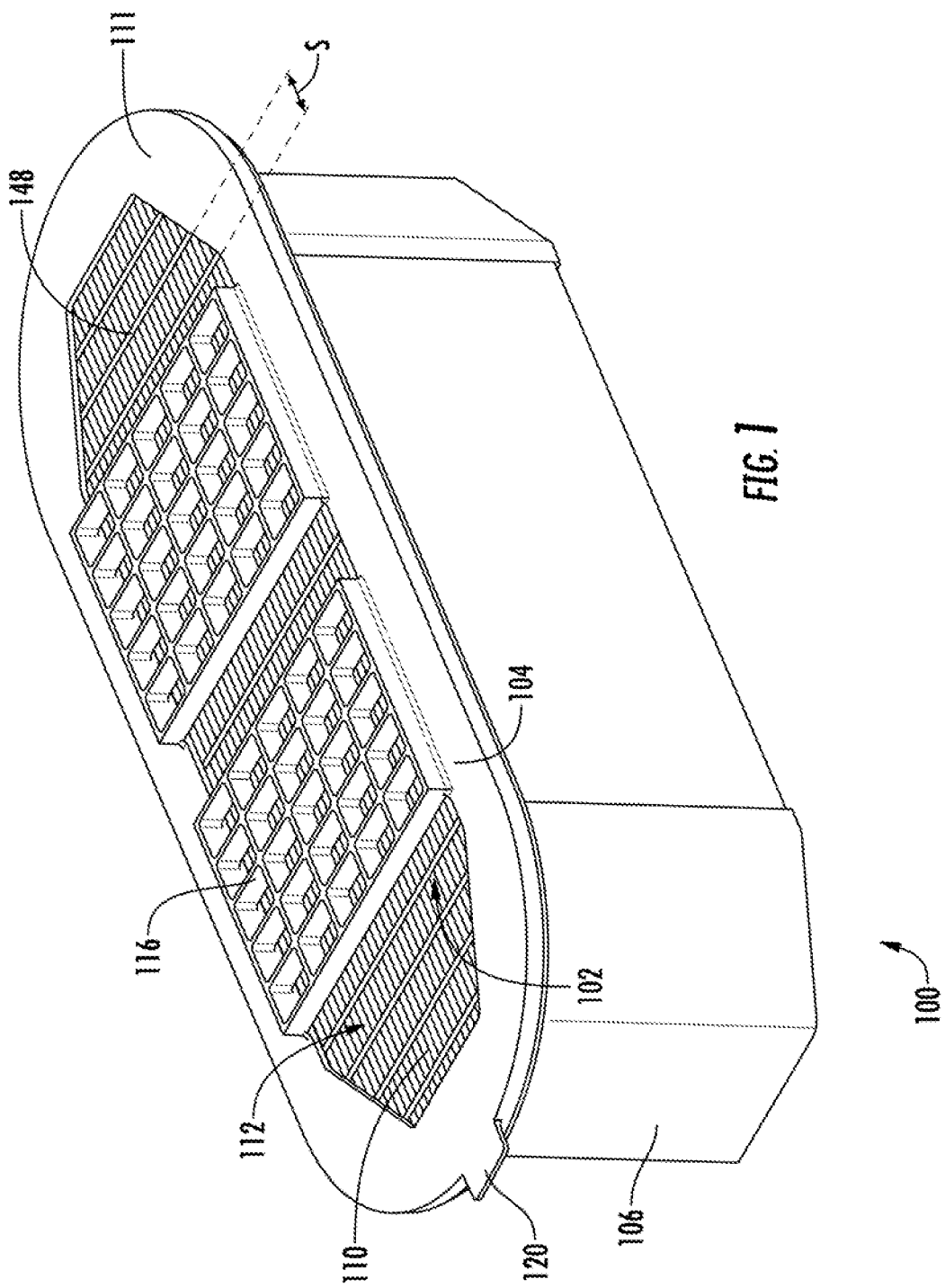
FIGS. 1 and 2 are perspective illustrations of a filter element according to an embodiment of the invention.
Figure 2:
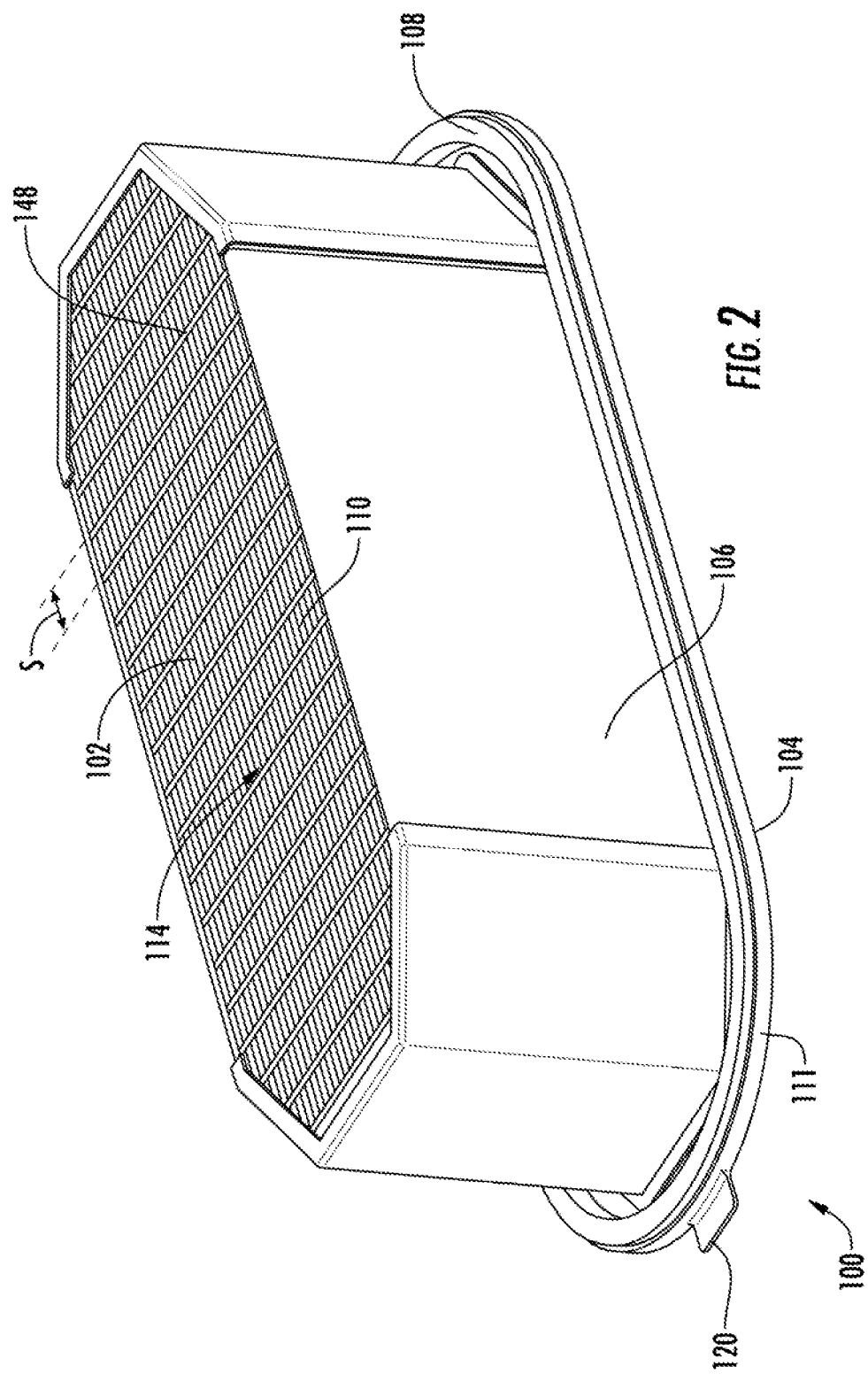

FIGS. 1 and 2 illustrate a filter element 100 according to an embodiment of the present application. This filter element 100 is representative in nature and filter elements of different sizes, shapes and configurations can be implemented using concepts of the present application. The filter element 100 generally includes a filter media pack 102, a support frame 104, an outer cover 106 and a seal 108.

The filter media pack 102 is formed from a continuous sheet of filter media 110 that is folded to form a plurality of pleat panels that extend between pleat folds. The pleat folds for a first set of pleat folds that forms a first flow face 112 (FIG. 1) and a second set of pleat folds that forms a second flow face 114. In the illustrated embodiment, the first and second flow faces 114 are generally parallel to one another and the pleat panels extend generally perpendicularly between the first and second flow faces 112, 114.

As will be discussed in more detail below, aspects of the present application apply to relatively tall pleat panels (e.g. deep pleat arrangements) and utilize strategically placed intermittent glue beads (also referred to as glue bead sections) on the opposed surfaces of the filter media. The glue beads fix the alignment of the pleat panels and provide improved rigidity to the media pack 102 such as under high-pressure differential conditions, such as during reverse pulse cleaning operations.

Glue bead sections on one surface of the filter media are aligned, at least in part, with glue bead sections on the opposite surface of the filter media 110 creating a rigid pleat pack structure.

In some implementations, the filter media 110 may be coated with a gradient density nanofiber layer, which improves the filter efficiency and dust holding capacity. The filter media 110 typically will be either cellulose, cellulose/synthetic blend, or fully synthetic and may include a gradient density nanofiber layer on the dust collection side, e.g. upstream side. The nanofiber matrix incorporates a layer of coarse nanofibers layered over a coating of fine nanofibers. The layer of coarse nanofibers has an average fiber diameter that is greater than the average fiber diameter of the layer of finer nanofibers. In one example, the layer of finer nanofibers has an average fiber diameter of between 100 nm and 300 nm where the layer of coarse nanofibers has an average fiber diameter of between 800 and 1000 nm. In another example, the average fiber diameter of the layer of coarse nanofibers is as least double, and preferably, at least triple, and even more preferably, at least four times, the average fiber diameter of the layer of finer nanofibers.

The fine nanofibers would typically be applied to a base media layer, making a three layer arrangement. The nanofiber coating will enable the filter to efficiently capture extremely small particles and achieve an ASHRAE MERV 15 rating. It will also give it high dust holding capacity, which can extend the filter life and lower operating cost of the dust collection system.

In another embodiment, the filter media 110 may be a single layer nanofiber media which will enable the filter to capture extremely small particles and achieve an ASHRAE MERV 15 rating. However, in this implementation, the dust holding capacity may be diminished.

The seal 108 is attached to the support frame 104 and particularly flange 111 that extends outboard of the filter media pack 102. The seal 108 is used to seal the filter element 100 to other portions of an air filter assembly, such as a filter housing in which the filter element 100 may be removably mounted. The support frame 104 is reinforced with a grid structure 116 spanning across a portion of the flow face 112 of the media pack 102. Flow face 112 in this embodiment is a clean fluid side of the filter element 100, but could be, in other embodiments the dirty fluid side. One consideration could be whether the pressure differential across the filter media pack 102 is greater during filtering operations or during filter cleaning operations (e.g. reverse pulse operations) such that the grid structure 116 is on the side that needs the most support.

The seal 108 is preferably an elastomeric material to provide good sealing capabilities and to serve as a barrier between the particulate collection side (e.g. upstream) and the clean side (e.g. downstream) of the filter element 100.

In addition to flange 111, the support frame 104 may include one or more outward projections 120 to enable installation and removal of filter element 100 from a dust collector/filter housing.

The support frame 104 is secured to the media pack 102 directly or indirectly. For instance, the support frame could be adhesively secured to the media pack 102 or could be attached to the cover 106.

The cover 106 surrounds the filter media pack 102 and can be used to help seal ends of the pleated media, and particularly spaces formed between adjacent pleat panels. For instance, the cover 106 could include plastic or sheet metal components, or dense textile material attached to the media pack 102 with an adhesive. Again, at the ends, the cover 106 will seal the edges of the filter media pack at the pleat pack ends to prevent particulate bypass. The sides of the pleat pack can be covered by a plastic or sheet metal component, or dense textile material to protect the filter media during handling and installation. An alternative design may use high-density urethane material molded to or sprayed on the ends of pleat pack to encapsulate the media edges. Further, in some embodiments, the pleat pack ends could be sealed using a foamed urethane, but the support provided by the plastic, metal or high-density urethane is preferred.

Features of embodiments of the present application provide for improved air flow through the filter element 100 both during filtering activities as well as reverse pulse activities. In particular, the structure of the media pack 102 is configured to create open flow passages into the filter media pack 102 on the particulate collection side, and out of the filter media pack 102 on the clean side.

Figure 3:
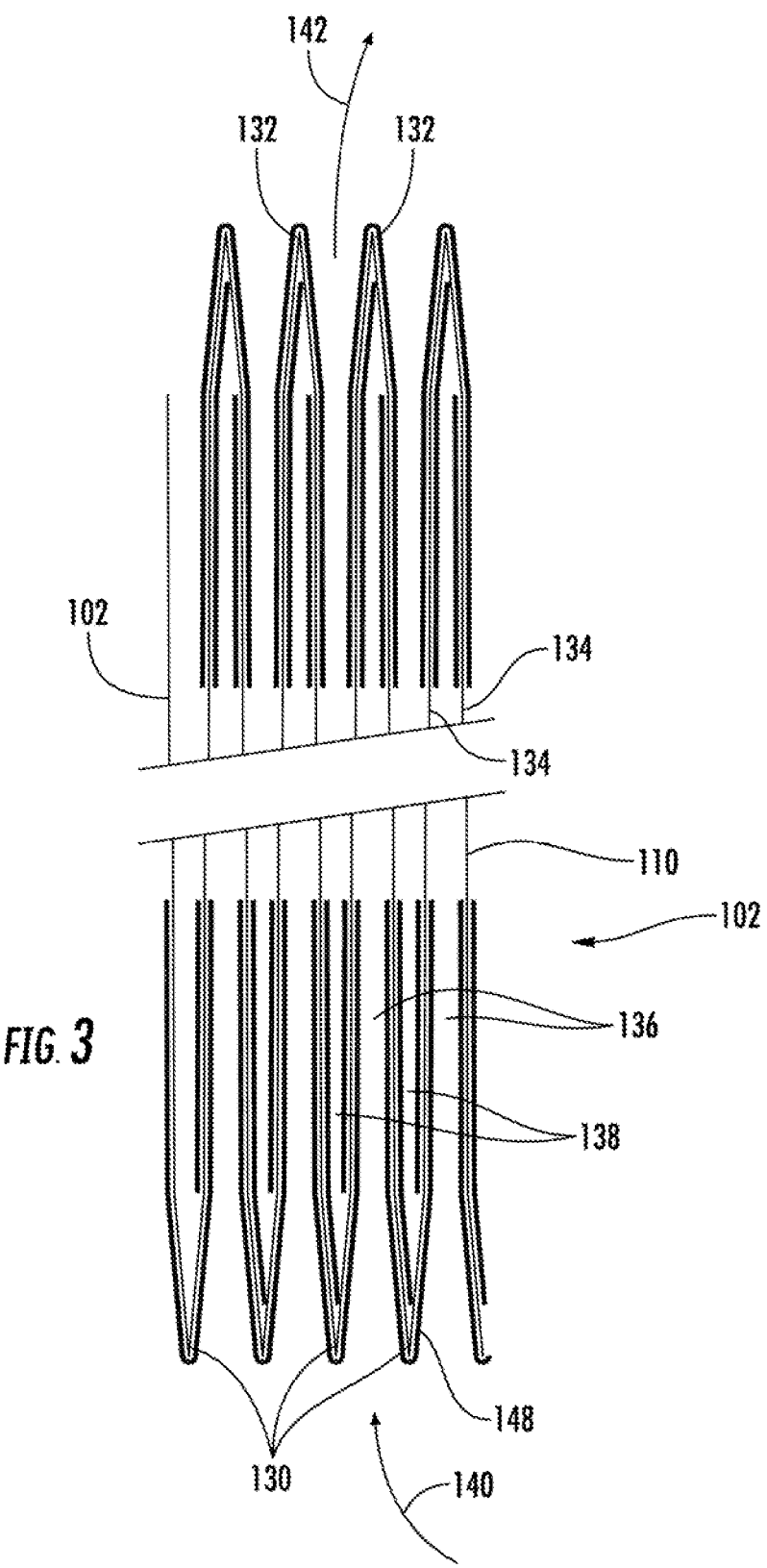
FIG. 3 is a cross-sectional illustration of the filter media pack of the filter element of FIGS. 1 and 2.
Figure 4:
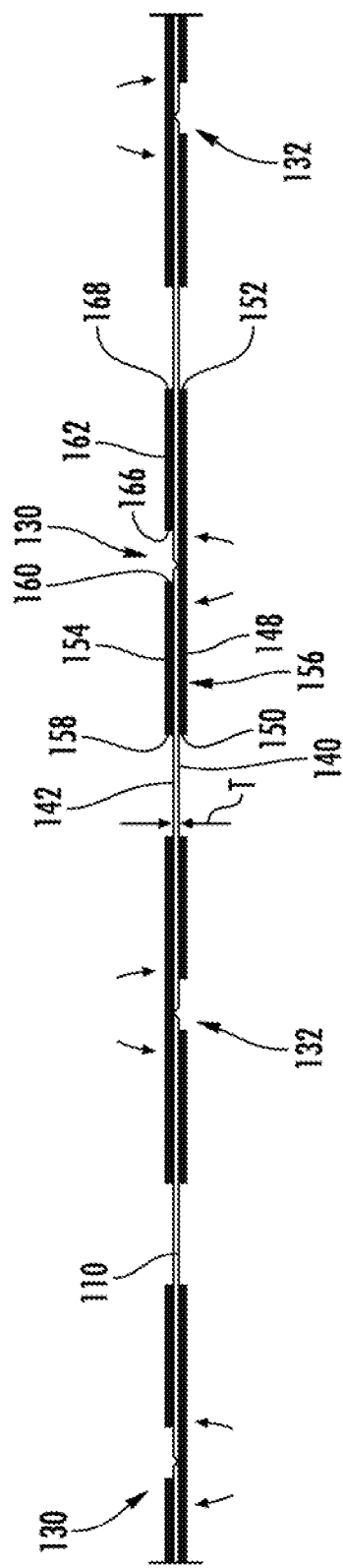
FIG. 4 is a cross-sectional illustration of a portion of the pleat pack of the filter element of FIGS. 1 and 2 prior to folding of the filter media by subsequent to application of the glue bead sections.

FIGS. 3 and 4 illustrate a section of an embodiment the filter media and corresponding glue beads applied thereto to properly maintain the spacing and orientation of the pleat panels of the filter media pack.

The glue bead design and placement is important to performance of the filter element 1W and serves several purposes. Optimal filter performance is achieved when the space between adjacent pleat panels is open to allow unobstructed flow of particulate to the entire surface of the filter media 102. Pleat shape (e.g. based on the positioning of adjacent pleat panels) that is straight and has minimal curvature prevents media-to-media (pleat panel-to-pleat panel) contact between adjacent pleat panels, which can block the particulate flow path deeper into the space between adjacent pleat panels as well as blind off surface area for filtering purposes. Additionally, the flow path and spacing between adjacent pleat panels must be open to allow the particulate collected on the upstream surface of the filter media to be ejected from the spacing between adjacent pleat panels during pulse cleaning. On the clean side of the filter media 102 (e.g. the downstream side), the pleat panels must be sufficiently spaced to allow for an open flow path to allow unobstructed flow of the pulse cleaning air into the full depth of the filter element 100 to ensure the most effective pulse cleaning.

FIG. 3 is a representative illustration of a portion of filter media pack 102 in a folded configuration. The filter media pack 102 has been folded about a plurality of pleat folds 130, 132 with pleat panels 134 extending therebetween and forming spaces 136, 138.

Each pleat fold 130, 132 may be considered a peak when viewed from the outer side thereof and a valley when viewed from an inner side thereof.

The spaces 136, 138 alternate between inlet spaces 136 and outlet spaces 138. The inlet spaces 136 have mouths formed between adjacent pleat folds 130 and the corresponding adjacent pleat panels 134 bordering the spaces 136. The inlet spaces 136 open in an upstream direction and receive dirty fluid (illustrated by arrow 140). The outlet spaces 140 have mouths formed between adjacent pleat folds 132 and the corresponding pleat panels 134 bordering the spaces 138. The outlet spaces 138 open in a downward direction and allow cleaned fluid (illustrated by arrow 142) to exit the filter media pack.

Pleat folds 130, 132 have been folded in an alternating orientation such that pleat folds 130 are folded in an opposite direction as pleat folds 132. This alternating folded orientation allows for the inlet and outlet spaces 136, 138.

The pleat folds 130, 132 may be understood to generally define the flow faces 112, 114 of the media pack 102.

Various sections of adhesive, referred to generically as glue bead sections, are provided to stabilize the filter media pack 102 and provide the necessary spacing between and relative positioning of adjacent pleat panels 134 once folded.

FIG. 4 illustrates the filter media 110 prior to folding and formation of the pleat folds 130, 132 but after application of the glue bead sections. The filter media 110 is a continuous sheet of filter media having a thickness T formed between opposed surfaces 140, 142.

Figure 5:
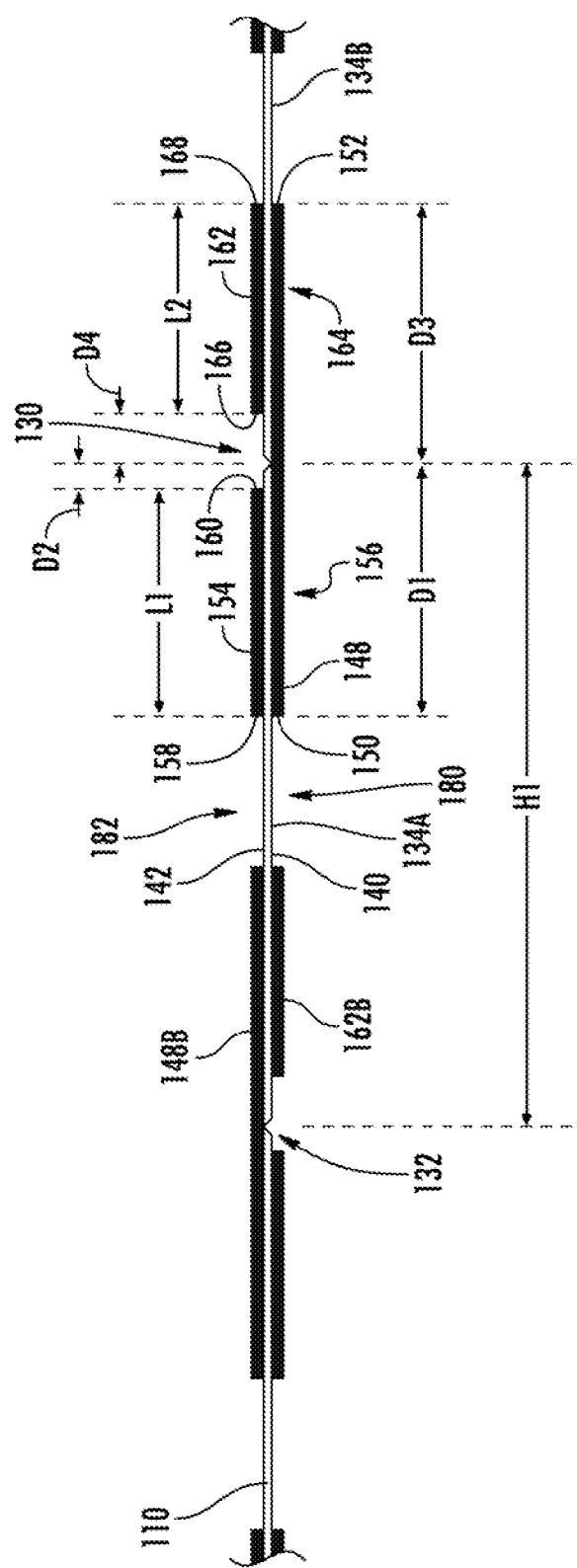
FIG. 5 is an enlarged illustration of a portion of FIG. 4.

FIG. 5 is an enlarged view of a portion of FIG. 4 illustrating only two pleat fold locations (e.g. one pleat fold 130 and one pleat fold 132). The following description is made with reference to both FIGS. 4 and 5.

In this embodiment, score lines illustrated in the form of valleys in the opposed surfaces 140 are provided. The score lines assist in forming pleat folds 130, 132. The score lines could be actual scores or could simply be localized compression of the filter media 110.

The filter media pack 102 has various glue bead sections at each pleat fold. The glue bead sections at each pleat fold are substantially the same except the alternate to which filter media surface 140, 142 they are applied depending on which pleat fold they are adjacent. The glue bead sections will first be described with reference to a pleat fold 130.

At pleat fold 130, an outer glue bead section 148 extends across the location of the pleat fold 130, e.g. the score line/valley. The outer glue bead section 148 extends around an outer periphery of the pleat fold 130, when folded. In other words, it is not located within the outlet space 138 formed due to the folding of pleat fold 130. The outer glue bead section 148 is applied to an outer side of pleat fold 130 and for this pleat fold 130 that corresponds to filter media surface 140. The outer glue bead section 148 extends between first and second ends 150, 152 with the pleat fold 130 positioned therebetween. In a preferred implementation, the pleat fold 130 is centered between first and second ends 150, 152.

A first inner glue bead section 154 is attached to a fold inner side and particularly to filter media surface 142 which is opposite filter media surface 140 to which the outer glue bead section 148 is applied. The first inner glue bead section 154 is overlapped with a first portion 156 of the outer glue bead section 148. The first portion 156 is the portion located between pleat fold 130 and first end 150. In this embodiment, the length L1 of the first inner glue bead section 154 is less than the distance D1 between first end 150 and pleat fold 130 such that the first inner glue bead section 154 does not completely axially overlap with first portion 156.

The first inner glue bead section 154 extends between ends 158, 160 with end 160 being positioned closer to pleat fold 130. The second end 160 is spaced a distance D2 from pleat fold 130.

It is noted that the first portion 156 and first inner glue bead section 154 are applied to pleat panel 134A, once the filter media 110 is folded.

A second inner glue bead section 162 is attached to the fold inner side and particularly to filter media surface 142 (e.g. on the same surface as the first inner glue bead section 154). Similarly, the second inner glue bead section 162 is on the filter media surface 142 opposite filter media surface 140 to which the outer glue bead section 148 is applied. The second inner glue bead section 162 is overlapped with a second portion 164 of the outer glue bead section 148. The second portion 162 is the portion located between pleat fold 130 and second end 152. In this embodiment, the length L2 of the second inner glue bead section 162 is less than the distance D3 between second end 152 and pleat fold 130 such that the second inner glue bead section does not completely axially overlap with second portion 162.

The second inner glue bead section 162 extends between ends 166, 168 with end 166 closer to pleat fold 130. The first end 166 is spaced a distance D4 from pleat fold 130. Length L2 of the second inner glue bead section 162 is less than length L1 of the first inner glue bead section 154. As such, distance D4 is greater than distance D2.

It is noted that the second portion 164 and second inner glue bead section 162 are applied to pleat panel 134B, once the filter media 110 is folded.

Pleat fold 132 has a similar arrangement of adjacent glue bead sections, but the glue bead sections are simply mirrored over the filter media 110 such that the outer glue bead section is applied to filter media surface 142 while the first and second inner glue bead sections are applied to filter media surface 140.

Figure 6:
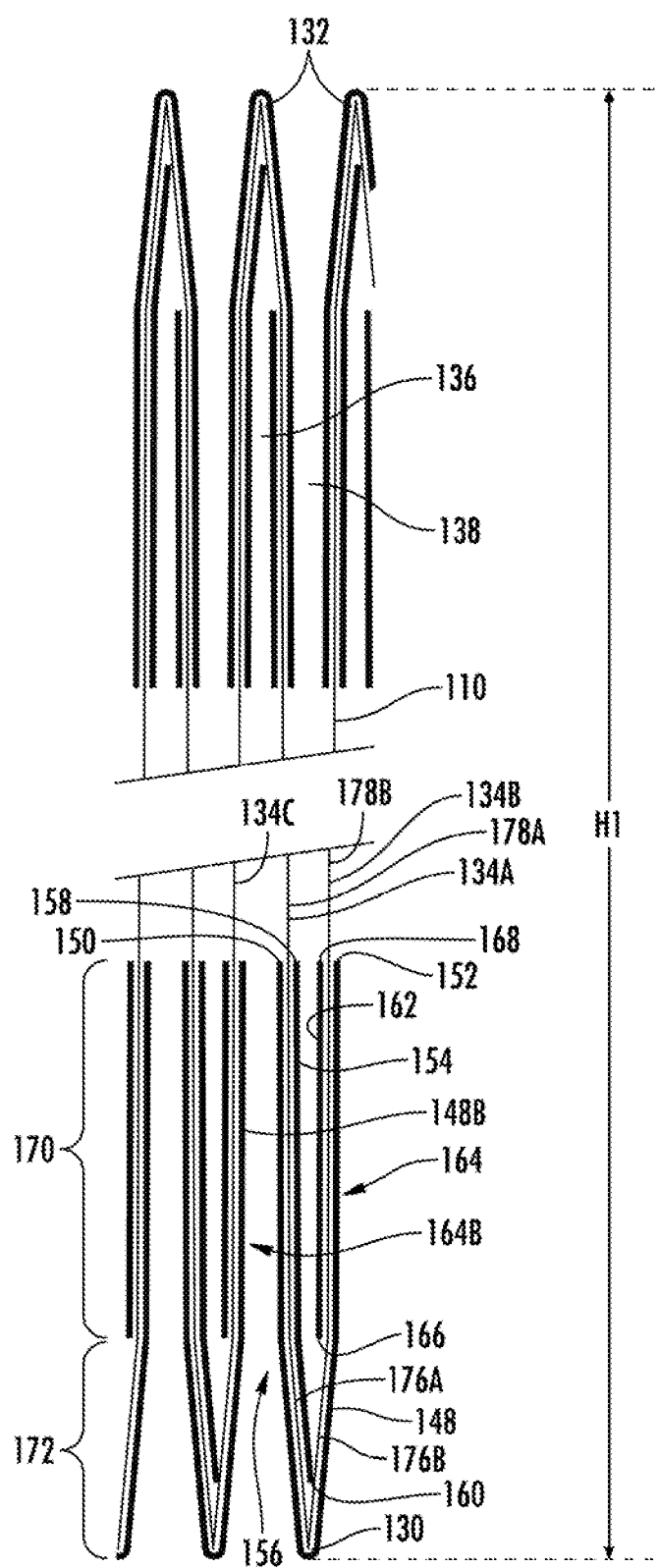
FIG. 6 is an enlarged illustration of a portion of FIG. 3.

FIG. 6 is an enlarged view of the filter media 110 in its folded form with the appropriate glue bead sections applied thereto. It is noted that the glue bead sections that are located within a same space (e.g. space 138) are illustrated as spaced apart simply for representative purposes. In related, these adjacent glue bead sections would be in contact with one another to secure the adjacent pleat panels to one another.

For example, first and second inner glue bead sections 154, 162 would, when filter media 110 is folded at pleat fold 130, be contacting one another. Once hardened, these glue bead sections 154, 162 would maintain the appropriate spacing of pleat panel 134A and 134B.

Similarly, outer glue bead section 148 would contact outer glue bead section 146B within space 136. More particularly, first portion 156 of outer glue bead section 148 would contact second portion 164B of outer glue bead section 148B. This would locate and maintain appropriate spacing between pleat panel 134A and adjacent pleat panel 134C. Again, this maintains the appropriate spacing for space 136 formed therebetween.

With reference to FIGS. 5 and 6, first end 150 aligns with first end 158. Second end 152 aligns with second end 168.

When pleat fold 130 is formed, end 160 does not align with end 166. As such, there is a section 170 that generally has four overlapping sections of glue bead for any pair of adjacent pleat panels (e.g. 134A and 134B) that are connected by a pleat fold (e.g. pleat fold 130). However, due to the difference in lengths L1 and L2 as well as the lack of glue between end 160 and the valley of pleat fold 130 on the inner side thereof, the is a second section 172 that does not have four overlapping sections of glue bead. Instead, section 172 has a portion that has three over lapping sections of glue (two sections on the outside formed by portions 156, 164 of the glue bead section 148 and one on the inside formed by first inner glue bead section 154) and then apportion that only two overlapping sections (two on the outside formed by portions 156, 164 of the glue bead section 148 with no glue on the inner side—e.g. neither of the first and second inner glue bead sections 154, 162).

This transitioning thickness to the amount of glue in this region causes the pleat panels 134A, 134B to have tapered portions 176A, 176B. These tapered portions taper away from one another when moving away from the pleat fold 130 connecting the corresponding pleat panels 134A, 134B together or alternatively toward one another when moving towards the pleat fold 130.

Due to the uniform amount of glue in first portion 170, these sets of glue maintain the corresponding portions of the pleat panels 134A, 134B to have parallel portions 178A, 178B.

Preferably, the tapered portions 176A, 176B extend no more than 10 percent of the height H1 of their corresponding pleat panel 134A, 134B. Preferably, the parallel portions 178A, 178B extend at least 80 percent of the height H1 of their corresponding pleat panel 134A, 134B. As such, preferably, at least 80 percent of each pair of adjacent pleat panels 134 are parallel to one another once fully formed.

As noted with reference to FIG. 3, FIG. 6 is illustrated with tapers and spacings necessary for illustrating the various portions thereof.

With reference to FIG. 5, a first gap 180 is formed between the first portion 156 of the outer glue bead section 148 at pleat fold 130 and the end of the second inner glue bead section 162B at the pleat fold 132. Notably, pleat folds 130 and 132 are both connected to pleat panel 134A. A second gap 182 is formed between the second portion of the outer glue bead section 148B at the second pleat fold 132 connected to pleat panel 134 and the first inner glue bead section 154 at the first pleat fold 130 connected to the pleat panel 134A.

Preferably, to get the parallel orientation of adjacent pleat panels 134, a mid-point of the height H1 of pleat panel 134A, which is located between the first and second pleat folds 130, 132 connected to the pleat panel 134A is positioned within the first and second gaps 180, 182. In a more preferred implementation, the first and second gaps 180, 182 are centered on the mid-point of the height H1, e.g. centered between pleat folds 130, 132.

In a preferred implementation, the distances D1 is greater than lengths of the first and second gaps 180, 182.

As should be readily apparent, the glue bead section placement on both surfaces 140, 142 of the media 110 creates parallel flow passages into the filter pleat pack 102.

By aligning portions of the glue bead sections on one filter media surface with portions of the glue bead sections on the other filter media surface, this provides discrete flow passages from one side (e.g. flow face) of the media pack to the opposite side (e.g. the other flow face) of the media pack. An additional benefit of the glue bead sections is that the pleat panels 134 of the entire filter media pack 102 are bonded together, his significantly increases the rigidity and dimensional stability of the resulting filter media pack 102, as opposed to a non-glued pleat pack with excessive pleat movement and poor dimensional stability.

It should be noted that the sets of glue bead sections for the two adjacent pleat folds 130, 132 are all aligned relative to a width of the filter media 110 (e.g. at a same location along the pleat folds 130, 132 or into the page for FIGS. 5 and 6). However, multiple different sets of glue bead sections may be spaced apart along the pleat folds 130, 132 with each set having the various glue bead sections discussed above.

This again improves the flow characteristics through the filter media pack, reduces blinding effects due to adjacent pleat panels collapsing on one another, improves reverse pulse cleaning and particularly particulate ejection from the filter media during reverse pulse cleaning. This allows for improved depth penetration of the dirty fluid and particularly the particulates thereof increasing the efficiency of the entire upstream surface are used for filter purposes as well as improved reverse pulse cleaning.

While FIGS. 3-6 only illustrate one set of glue bead sections 148, 154, 162 at each pleat fold 130, 132. In most implementations, there would be a plurality of sets of glue bead sections spread out laterally along the width of the filter media sheet, e.g. spaced parallel to the axes defined by the pleat folds 130, 132. This is better illustrated by the lines formed by the outer glue bead sections 148 in FIGS. 1 and 2 formed at the flow faces 112, 114.

Figure 7:
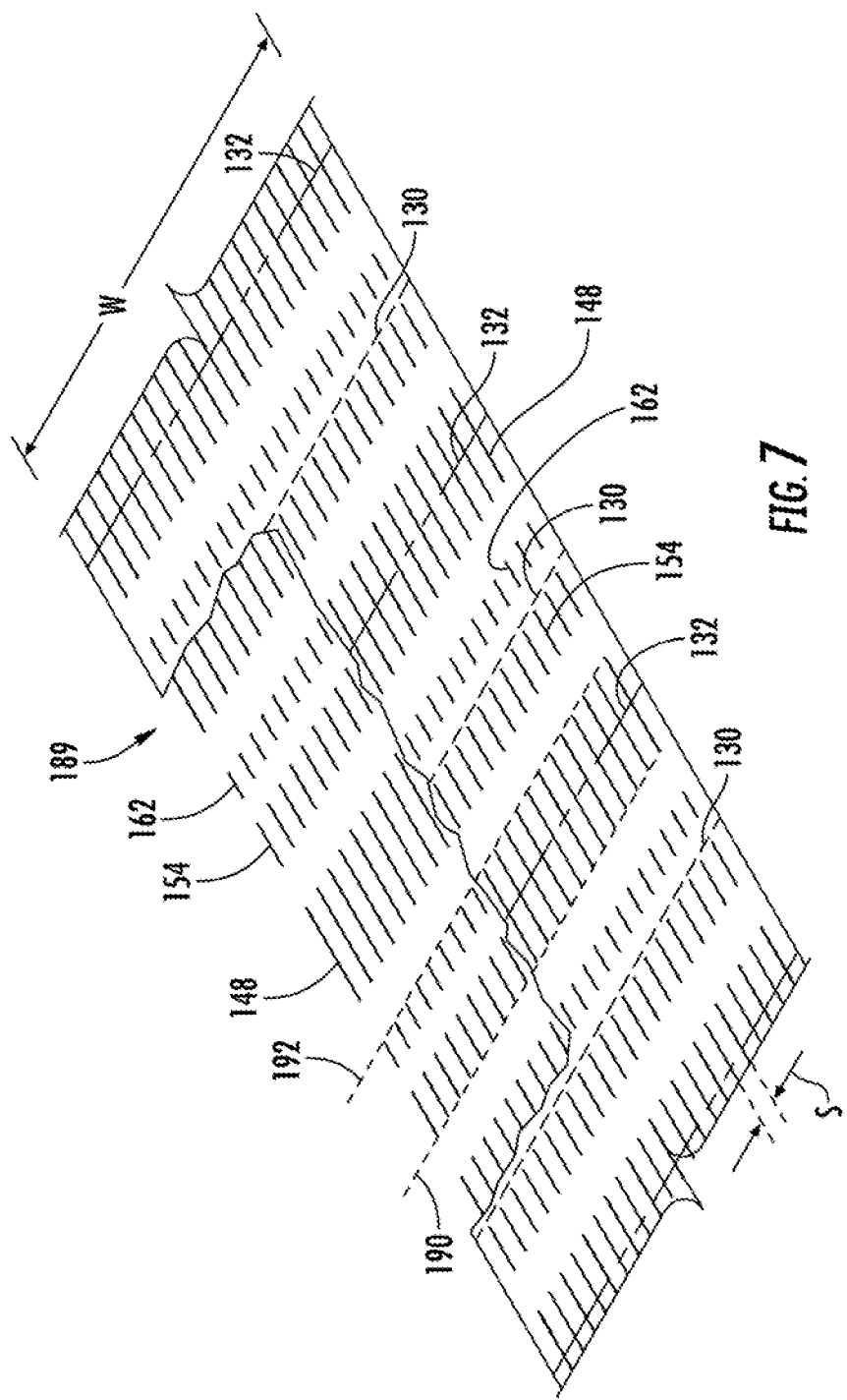
FIG. 7 is a top illustration of a portion of the filter media with the glue bead sections applied and a portion of the filter media removed to illustrate alignment of top and bottom glue bead sections as well as spacing of the sets of glue bead sections.

FIG. 7 illustrates the spacing previously discussed. FIG. 7 also has a portion of the filter media 110 cut away (at region 189 in FIG. 7) to show how the glue bead sections from one side of the filter media 110 aligns with the glue bead sections from the other side of the filter media 110.

In preferred embodiments, the spacing S (FIGS. 1, 2 and 7) between the spaced apart sets of glue bead sections is less than or equal to 2".

FIG. 7 also illustrates how the ends of the various glue bead sections align with one another, see e.g. dashed lines 190, 192.

The above identified embodiment allows for improved efficiency of deep pleated filter media packs. This arrangement can provide beneficial spacing as provided by dimples/embossments in the filter media with less filter media blinding while also adding the improved rigidity and dimensional stability. However, some embodiments could include dimples/embossments in addition to the glue bead arrangements described herein.

For example, the use of these glue bead section configurations is particularly useful in deep pleated filter media packs that have pleat heights H1 that are greater than or equal to 5".

Figure 8:
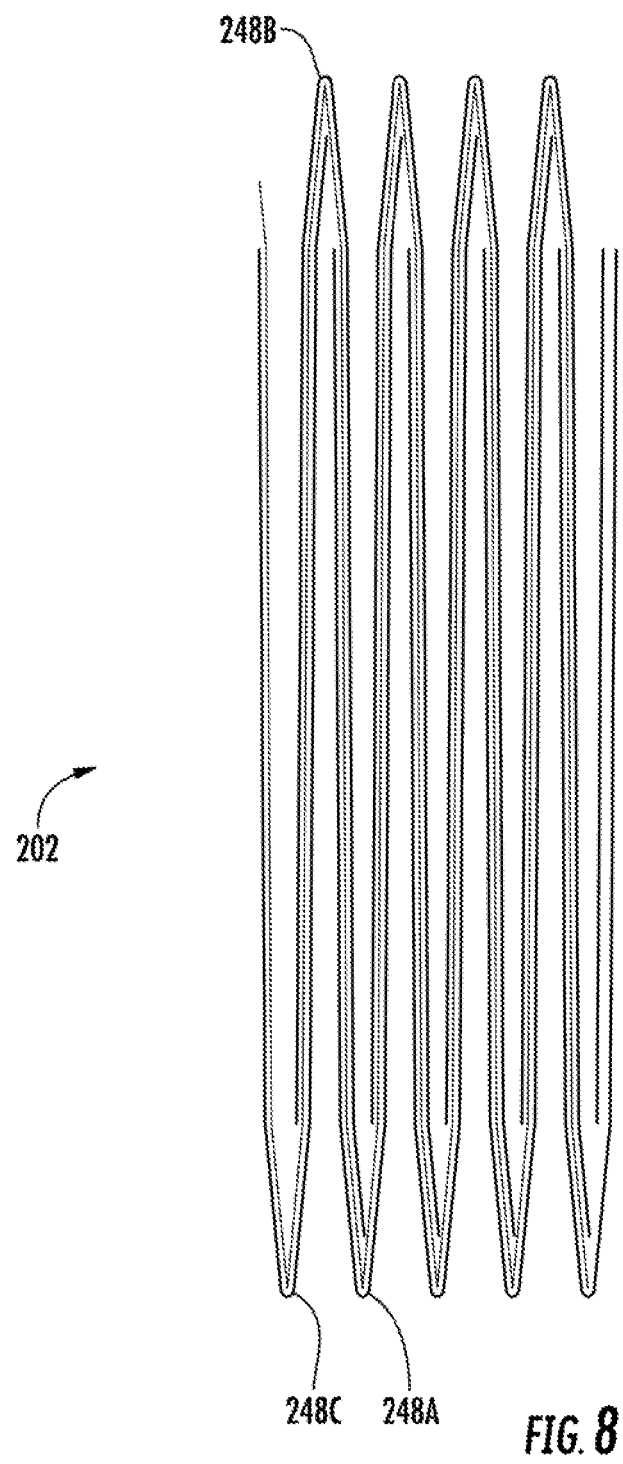
FIG. 8 is a cross-sectional illustration similar to FIG. 3 illustrating a further embodiment.

While the prior embodiments disclosed the various different glue bead sections with gaps 180, 182 formed between the glue bead sections at the pleat folds 130, 132 connected to a same pleat panel, FIG. 8 illustrates another embodiment that does not include the gaps. In this embodiment, three discrete glue bead sections 248A, 248B, 248C are proximate each pleat fold. More particularly, the inner glue bead sections 154, 162 of the prior embodiments have been connected to the outer glue bead sections 148. Like in the prior embodiment, the ends of these continuous glue bead sections 248A, 248C at a given pleat fold once again do not align such that the tapering affect to the adjacent pleat panels proximate the pleat folds occurs.

Figure 9:
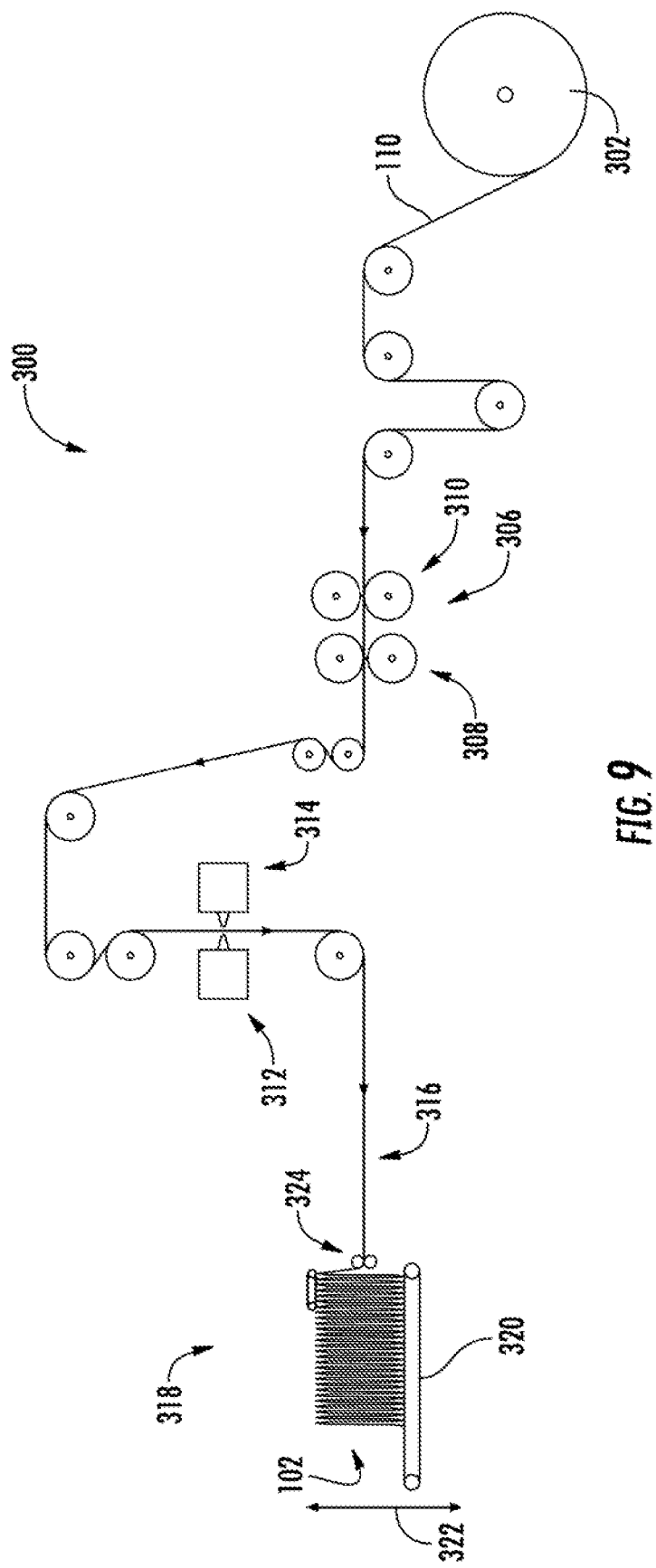
FIG. 9 is a simplified illustration of process for forming filter media packs according to embodiments of the application.

FIG. 9 is a simplified illustration of a system 300 for forming the pleated filter media packs 102. The system 300 includes a filter media supply station 302 where a roll 304 of filter media 110 is mounted. The filter media 110 is unwound from roll 304.

Downstream from the supply station is a scoring station 306. The scoring station includes first and second sets of scoring rolls 308, 310 to score the filter media 110 to assist in subsequent folding of the filter media (e.g. to form pleat folds 130, 132). One set of scoring rolls 308 forms the score for pleat fold 130 while the other set of scoring rolls 310 forms the score for pleat fold 132.

Downstream from the scoring rolls 308, 310 are glue applicators 312, 314. One glue applicator 312 applies the glue bead sections to one surface of the filter media 110 while the other glue applicator 314 applies the glue bead sections to the other surface of the filter media 110.

The system 300 includes an optional glue cooling section 316 that allows the glue to cool and firm up prior to folding to allow for better post folding dimensional stability.

Downstream from the glue cooling section 316 is a folding mechanism 318 for folding the filter media 110 to form the pleat panels 134. In this system, the folding mechanism 318 includes at least one conveyor 320 that oscillates vertically up and down (illustrated by arrow 322) relative to some input rolls 324 to cause the filter media 110 to fold at the previously formed scores.

Figure 10:
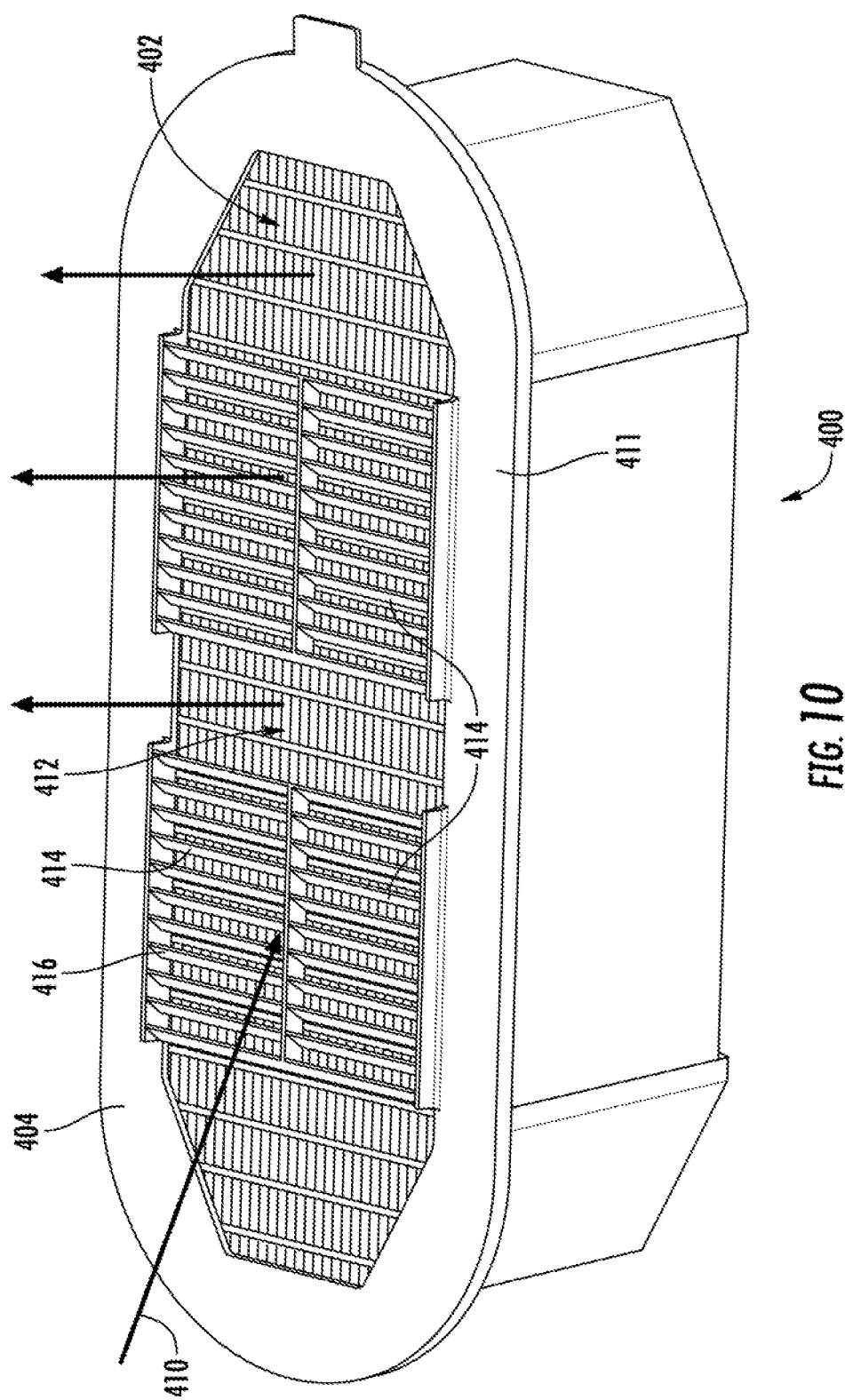
FIG. 10 is a further embodiment of a filter element according to the teachings of the present application.

FIG. 10 illustrates a further filter element 400. The filter element 400 includes a media pack 402 formed according to the embodiments and aspects described above.

In this embodiment, the filter frame 404 has been modified. Once again, the filter frame 404 is positioned proximate an outlet side, e.g. clean fluid side, of the filter media pack 402.

To reverse pulse clean a filter element and particularly the filter media pack, clean air is blown in a reverse direction through the filter media pack (e.g. from the outlet side to the inlet side or from the clean fluid side to the dirty fluid side). This action dislodges bulk particulates from the filter media such that the filtering capacity of the filter media is replenished to at least some degree.

In some implementations, such as the one illustrated in FIG. 10, the reverse pulse air flow (illustrated by arrow 410) is not perpendicular to the outlet flow face 412. Due to this angled orientation of the reverse pulse air flow, the applicants have determined that the reverse pulse does not operate evenly across the entire filter media pack 402.

As such, the grid 416 of this embodiment has been modified. In this embodiment, grid bars 414 of grid 416 has a louvered configuration. As such, the grid bars 414 extend outward from the outlet flow face 412 at an angle, i.e. non-orthogonal, orientation.

The angled grid bars 414 improve pulse cleaning air flow 410. The inclined grid bars 414 redirect some of the pulse cleaning air flow 410 from the back half of the filter element 400 (left side of the illustration in FIG. 10) to the front half of the filter element 400 (right side). Thus the angled grid bars 414 significantly improves effectiveness of the pulse cleaning across the entire filter media pack 402. The grid bars 414 in this embodiment are canted away from the path (e.g. illustrated by arrow 410) of the incoming reverse pulse air flow, again to direct a portion of the air flow towards the opposed side of the filter element 400.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   a pleated media pack formed from a continuous sheet of filter media having opposed surfaces with a thickness therebetween, the pleated filter media having:
      a plurality of pleat panels, each pleat panel of the plurality of pleat panels having a height;
      a plurality of pleat folds, each pleat fold of the plurality of pleat folds interconnecting a corresponding pair of adjacent pleat panels of the plurality of pleat panels, each pleat fold having a fold inner side and a fold outer side, the height of each pleat panel being defined between the pleat folds associated with each pleat panel;
      at each pleat fold, there is:
         an outer glue bead section on the fold outer side extending across the pleat fold with the pleat fold interposed between opposed first and second ends of the outer glue bead section, the outer glue bead section having a first portion between the first end and the pleat fold and a second portion between the second end and the pleat fold;
         a first inner glue bead section extending between first and second ends on the fold inner side overlapped with the first portion of the outer glue bead section, the first inner glue bead section is spaced away from the pleat fold and does not extend across the pleat fold;
         a second inner glue bead section extending between first and second ends on the fold inner side overlapped with the second portion of the outer glue bead section, the second inner glue bead section is spaced away from the pleat fold and does not extend across the pleat fold;
         when folded, the first and second inner glue bead sections at each pleat fold contact one another to secure the adjacent pleat panels interconnected by the pleat fold relative to one another.

2. The filter element of claim 1, wherein:
   a first distance is defined between the second end of the first inner glue bead section and the pleat fold;
   a second distance is defined between the first end of the second inner glue bead section and the pleat fold; and
   the second distance is different than the first distance.

3. The filter element of claim 1, wherein a thickness of the first and second inner glue bead sections at each pleat fold measured perpendicular to the surfaces of the sheet of filter media are substantially the same.

4. The filter element of claim 1, wherein the outer glue bead section at one pleat fold is on an opposite surface of the sheet of filter media as the outer glue bead section at another immediately adjacent pleat fold.

5. The filter element of claim 1, wherein when the sheet of filter media is folded, the first portion of an outer glue bead at a first fold contacts the second portion of an outer glue bead at a second fold, the first and second folds not being connected to a same pleat panel.

6. The filter element of claim 2, wherein:
   at each pleat fold, each pleat panel interconnected by the pleat fold has a tapered portion extending outward from the pleat fold less than or equal to the second distance, the tapered portions tapering away from one another when moving away from the pleat fold.

7. The filter element of claim 6, wherein the first distance is less than 10% of the height of the pleat panels.

8. The filter element of claim 6, wherein:
   each pleat panel has:
      two tapered portions, one tapered portion associated with each pleat fold connected to the pleat panel;
      a parallel portion formed between the tapered portions;
      the parallel portions of adjacent pleat panels being parallel with one another, when the filter media sheet is folded about the pleat folds.

9. The filter element of claim 8, wherein each parallel portion has a length that is at least 80% of the height of the pleat panel.

10. The filter element of claim 6, wherein a thickness of any glue forming any glue bead or beads between adjacent tapered portions proximate each pleat fold is less than twice a thickness of any one of the outer glue bead section, the first inner glue bead section or the second inner glue bead section.

11. The filter element of claim 1, wherein no glue bead extends across the pleat fold on the inner side of the pleat folds.

12. The filter element of claim 1, wherein:
   the plurality of pleat folds alternate between being folded in a first fold direction and a second fold direction that is opposite the first fold direction; and
   for each pleat fold, the fold inner side is positioned between the corresponding pair of adjacent pleat panels that are interconnected by the pleat fold formed by one of the opposed surfaces of the filter media and the fold outer side is formed by the other one of the opposed surfaces of the filter media.

13. The filter element of claim 1, wherein there are at each pleat fold:
   a plurality of outer glue bead sections that are laterally spaced apart along the pleat fold;
   a plurality of first inner glue bead sections that are laterally spaced apart along the pleat fold; and
   a plurality of second inner glue bead sections that are laterally spaced apart along the pleat fold.

14. The filter element of claim 13, wherein:
   the lateral spacing between adjacent ones of the outer glue bead sections of the plurality of outer glue bead sections is no greater than 2";
   the lateral spacing between adjacent ones of the first inner glue bead sections of the plurality of first inner glue bead sections is no greater than 2"; and
   the lateral spacing between adjacent ones of the second inner glue bead sections of the plurality of second inner glue bead sections is no greater than 2".

15. The filter element of claim 1 further comprising:
   an external cover surrounding the pleated media pack; and
   a reinforcing grid extending across at least one flow face defined by a plurality of the pleat folds, the reinforcing grid including a support flange that extends outboard of the filter media pack; and
   a seal member carried by the support flange.

16. The filter element of claim 1, wherein the filter media includes a gradient density layer including a layer of coarse nanofibers layered over a layer of finer nanofibers, the coarse nanofibers being upstream of the finer nanofibers.

17. The filter element of claim 16, wherein the filter media includes a base layer of filter media, the layer of finer nanofibers being positioned between the coarse nanofibers and the base layer of filter media.

18. A filter arrangement comprising:
a filter element according to claim 1, the filter element including:
a support grid mounted to an outlet face of the filter media pack, the support grid including a plurality of grid bars that extend outward from the outlet face at a non-perpendicular, non-parallel angle relative to the outlet face.

19. A method of forming a filter element according to claim 1, the method comprising;
forming a pleated media pack from continuous sheet of filter media having opposed surfaces with a thickness therebetween, forming the pleated filter media pack includes:
folding the continuous sheet of filter media to form a plurality of pleat panels interconnected by a plurality of pleat folds, each pleat panel of the plurality of pleat panels having a height, the height of each pleat panel being defined between the pleat folds associated with each pleat panel, each pleat fold of the plurality of pleat folds interconnecting a corresponding pair of adjacent pleat panels of the plurality of pleat panels, each pleat fold having a fold inner side and a fold outer side;
at each pleat fold, further comprising:
applying an outer glue bead section on the fold outer side extending across the pleat fold with the pleat fold interposed between opposed first and second ends of the outer glue bead section, the outer glue bead section having a first portion between the first end and the pleat fold and a second portion between the second end and the pleat fold;
applying a first inner glue bead section extending between first and second ends on the fold inner side overlapped with the first portion of the outer glue bead section, the first inner glue bead section being spaced away from the pleat fold and does not extend across the pleat fold;
applying a second inner glue bead section extending between first and second ends on the fold inner side overlapped with the second portion of the outer glue bead section, the second glue bead section being spaced away from the pleat fold and does not extend across the pleat fold;
wherein the step of folding occurs after the steps of applying the outer glue bead section, applying the first inner glue bead section, and applying the second inner glue bead section, the step of folding contacts the first inner glue bead section with the second inner glue bead section at each pleat fold to secure the adjacent pleat panels interconnected by the pleat fold relative to one another.

20. The method of claim 19, wherein the step of folding contacts a portion of an outer glue bead at a first fold with a second portion of an outer glue bead at a second fold, the first and second folds not being connected to a same pleat panel.

21. The filter element of claim 1, wherein the first and second inner glue bead sections form no part of and do not contact any part of the outer glue bead sections prior to or after the filter media is folded to form the pleat folds.

22. The filter element of claim 1, wherein the first and second ends of the first and second inner glue bead sections do not contact any portion of the outer glue bead sections.

23. A filter element comprising:
a pleated media pack formed from a continuous sheet of filter media having opposed surfaces with a thickness therebetween, the pleated filter media having:
a plurality of pleat panels, each pleat panel of the plurality of pleat panels having a height;
a plurality of pleat folds, each pleat fold of the plurality of pleat folds interconnecting a corresponding pair of adjacent pleat panels of the plurality of pleat panels, each pleat fold having a fold inner side and a fold outer side, the height of each pleat panel being defined between the pleat folds associated with each pleat panel;
at each pleat fold, there is:
an outer glue bead section on the fold outer side extending across the pleat fold with the pleat fold interposed between opposed first and second ends of the outer glue bead section, the outer glue bead section having a first portion between the first end and the pleat fold and a second portion between the second end and the pleat fold;
a first inner glue bead section extending between first and second ends on the fold inner side overlapped with the first portion of the outer glue bead section, the first inner glue bead section is spaced away from the pleat fold and does not extend across the pleat fold;
a second inner glue bead section extending between first and second ends on the fold inner side overlapped with the second portion of the outer glue bead section, the second inner glue bead section is spaced away from the pleat fold and does not extend across the pleat fold;
when folded, the first and second inner glue bead sections at each pleat fold contact one another to secure the adjacent pleat panels interconnected by the pleat fold relative to one another;
wherein for each pleat panel of the plurality of pleat panels, the pleat panel has attached thereto:
the first portion of an outer glue bead section at a first pleat fold connected to the pleat panel;
the first inner glue bead section at the first pleat fold connected to the pleat panel;
the second portion of an outer glue bead section at a second pleat fold connected to the pleat panel;
the second inner glue bead section at the second pleat fold connected to the pleat panel.

24. The filter element of claim 23, wherein for each pleat panel of the plurality of pleat panels:
the first portion of the outer glue bead section at the first pleat fold connected to the pleat panel and the second inner glue bead section at the second pleat fold connected to the pleat panel are located on a same first surface of the pleat panel; and
the second portion of the outer glue bead section at the second pleat fold connected to the pleat panel and the first inner glue bead section at the first pleat fold connected to the pleat panel are located on a same second surface of the pleat panel, the second surface being opposite the first surface.

25. The filter element of claim 23, wherein:
a first gap is formed between the first portion of the outer glue bead section at the first pleat fold connected to the pleat panel and the second inner glue bead section at the second pleat fold connected to the pleat panel; and
a second gap is formed between the second portion of the outer glue bead section at the second pleat fold connected to the pleat panel and the first inner glue bead section at the first pleat fold connected to the pleat panel.

26. The filter element of claim 25, wherein a mid-point of the height of each pleat panel located between the first and second pleat folds connected to the pleat panel is positioned within the first and second gaps.

27. The filter element of claim 26, wherein the first and second gaps are centered on the mid-point of the height.

28. The filter element of claim 27, wherein lengths of the first portion of the outer glue bead section at the first fold connected to the pleat panel and the second portion of the outer glue bead section at the second fold connected to the pleat panel are greater than lengths of the first and second gaps.

29. A filter element comprising:
a pleated media pack formed from a continuous sheet of filter media having opposed surfaces with a thickness therebetween, the pleated filter media having:
  a plurality of pleat panels, each pleat panel of the plurality of pleat panels having a height;
  a plurality of pleat folds, each pleat fold of the plurality of pleat folds interconnecting a corresponding pair of adjacent pleat panels of the plurality of pleat panels, each pleat fold having a fold inner side and a fold outer side, the height of each pleat panel being defined between the pleat folds associated with each pleat panel;
  at each pleat fold, there is:
    an outer glue bead section on the fold outer side extending across the pleat fold with the pleat fold interposed between opposed first and second ends of the outer glue bead section, the outer glue bead section having a first portion between the first end and the pleat fold and a second portion between the second end and the pleat fold;
    a first inner glue bead section extending between first and second ends on the fold inner side overlapped with the first portion of the outer glue bead section, the first inner glue bead section is spaced away from the pleat fold and does not extend across the pleat fold;
    a second inner glue bead section extending between first and second ends on the fold inner side overlapped with the second portion of the outer glue bead section, the second inner glue bead section is spaced away from the pleat fold and does not extend across the pleat fold;
    when folded, the first and second inner glue bead sections at each pleat fold contact one another to secure the adjacent pleat panels interconnected by the pleat fold relative to one another;
wherein:
  a first distance is defined between the second end of the first inner glue bead section and the pleat fold;
  a second distance is defined between the first end of the second inner glue bead section and the pleat fold; and
  the second distance is different than the first distance;
wherein:
  the first inner glue bead section has a first length;
  the second inner glue bead section has a second length;
  at each pleat fold, when folded:
    the first end of the first inner glue bead section aligns with the second end of the second inner glue bead section; and
    the second end of the first inner glue bead section is offset from the first end of the second inner glue bead section, with the second end of the first inner glue bead section being closer to the pleat fold than the first end of the second inner glue bead section.

\* \* \* \* \*